United States Patent
Cimatti (10) Patent No.: US 8,579,354 B2
(45) Date of Patent: Nov. 12, 2013

(54) VEHICLE PROVIDED WITH A DETACHABLE CONVERTIBLE ROOF

(75) Inventor: Franco Cimatti, Pavullo (IT)

(73) Assignee: Ferrari S.p.A. (IT)

( * ) Notice: Subject to any disclaimer, the term of this patent is extended or adjusted under 35 U.S.C. 154(b) by 291 days.

(21) Appl. No.: 12/984,153

(22) Filed: Jan. 4, 2011

(65) Prior Publication Data
US 2011/0221228 A1    Sep. 15, 2011

(30) Foreign Application Priority Data

Mar. 11, 2010 (IT) ................ B02010A0147

(51) Int. Cl.
*B60J 7/00* (2006.01)
(52) U.S. Cl.
USPC .......................... 296/103; 296/102
(58) Field of Classification Search
USPC ............... 296/103, 121, 210, 107.01, 102
See application file for complete search history.

(56) References Cited

U.S. PATENT DOCUMENTS

| 5,979,969 | A | 11/1999 | Hilliard |
| 6,283,531 | B1 | 9/2001 | Tanigawa |
| 6,851,739 | B2 * | 2/2005 | Morley ........................ 296/102 |

FOREIGN PATENT DOCUMENTS

| DE | 4326291 A1 | 9/1994 |
| DE | 10120358 A1 | 10/2002 |
| DE | 102008027616 A1 | 12/2009 |

OTHER PUBLICATIONS

"Italian Application Serial No. IT B020100147, Search Report dated Aug. 3, 2010", 2 pgs.

\* cited by examiner

*Primary Examiner* — Joseph Pape
(74) *Attorney, Agent, or Firm* — Schwegman Lundberg & Woessner, P.A.

(57) ABSTRACT

A road vehicle: provided with a coachwork; an interior compartment, delimited by a windscreen supported by a frame; and a convertible roof, which can be connected to the coachwork for closing, at the top, the interior compartment and is provided with a covering cloth comprising two side beams at respective side ends; and a supporting frame, which can be mechanically connected to the coachwork for supporting the covering cloth; each side beam is provided with: a rigid side panel, which rises in cantilever fashion from a rear end of the side beam and, in the position for closing the interior compartment, is set substantially vertical; and engagement means for connecting the covering cloth to the frame and for connecting the two side panels to a portion of the coachwork that delimits the interior compartment at the rear and at the sides.

23 Claims, 11 Drawing Sheets

VEHICLE PROVIDED WITH A DETACHABLE CONVERTIBLE ROOF

PRIORITY CLAIM

This application claims the benefit of priority under 35 U.S.C. Section 119 to Italian Patent Application Serial No. BO2010A 000147, filed on Mar. 11, 2010, which is incorporated herein by reference in its entirety.

TECHNICAL FIELD

The present subject matter relates to a vehicle provided with a convertible top.

BACKGROUND

In particular, the present subject matter relates to a vehicle provided with a body, a passenger compartment enclosed by the body and delimited at the front by a windscreen enclosed by a U-shaped frame, and a convertible roof, which can be connected to the body for closing the passenger compartment at the top and in turn comprises a covering canvas and a supporting frame that can be mechanically connected to the body and supports the covering canvas.

This type of two-seater sports vehicles, better known as "roadsters" or also "spyders", are increasingly widespread on the automotive market in Europe and above all in the United States. For its characteristics, the vehicle described above is particularly widespread in those areas that are characterized by sunny days and high temperatures for a fair share of the year.

The convertible roof can be made of canvas or else of metal or plastic. In the case where the vehicle is provided with a convertible roof made of canvas, the latter is usually housed within a purposely provided compartment made in the body and set outside the passenger compartment.

In the event of wet weather, an occupant of the vehicle has to extract the folded convertible roof from the purposely provided compartment and connect it to the body to close the passenger compartment at the top. The operations to be carried out in order to connect the convertible roof to the body may require a few minutes and can be particularly complex in the case where just one person has to carry out the operations.

For example, the document U.S. Pat. No. 6,283,531 regards a road vehicle comprising a body, a passenger compartment enclosed by the body and delimited at the front by a windscreen supported by a U-shaped frame, and a hard-top roof, which can be connected to the body for closing the passenger compartment at the top and comprises a rigid top wall and a pair of rigid side panels, made of a single piece with the top wall, for closing the passenger compartment at the sides. Moreover provided are front engagement means for connecting the top wall to the U-shaped frame, and rear engagement means for connecting the two side panels to a portion of the body that delimits the passenger compartment at the rear. A convertible roof made according to U.S. Pat. No. 6,283,531 is excessively cumbersome, and the operations to be carried out for connecting the convertible roof to the body may be complex in the case where just one person has to carry out the operations.

The document No. DE10120358 describes, instead, a road vehicle comprising a body, a passenger compartment enclosed by the body and delimited at the front by a windscreen supported by a U-shaped frame, and a convertible roof, which can be connected to the body for closing the passenger compartment at the top and in turn comprises a covering canvas that is substantially horizontal in the position for closing the passenger compartment. The roof then comprises two side members that can be mechanically connected to the body so as to support the covering canvas. Each side member comprises a rigid side panel that rises in cantilever fashion from a rear end of the side member and, in the position for closing the passenger compartment, is set substantially vertical and perpendicular to the covering canvas, and engagement means for connecting the covering canvas to the frame of the windscreen and for connecting the two side panels to a portion of the body that delimits the passenger compartment at the rear and at the sides. The covering canvas at its side ends is inserted within respective guides made in the two side members and slides within these guides until it reaches the frame of the windscreen; it follows that the operations to be carried out for connecting the convertible roof to the body may be complex and burdensome in terms of time in the case where just one person has to carry out the operations.

SUMMARY

Examples of the present subject matter provide a vehicle equipped with a convertible roof, said roof being free from the drawbacks of the prior art, being light, of small overall dimensions, and easy and inexpensive to produce, and at the same time enabling easy connection thereof to the vehicle in the case where just one person has to carry out the operation.

According to examples of the present subject matter, a vehicle equipped with a convertible roof is provided according to what is claimed in the annexed claims.

BRIEF DESCRIPTION OF THE DRAWINGS

The present invention will now be described with reference to the annexed drawings, which illustrate some non-limiting examples of embodiments thereof and in which.

DETAILED DESCRIPTION

Figure 1:
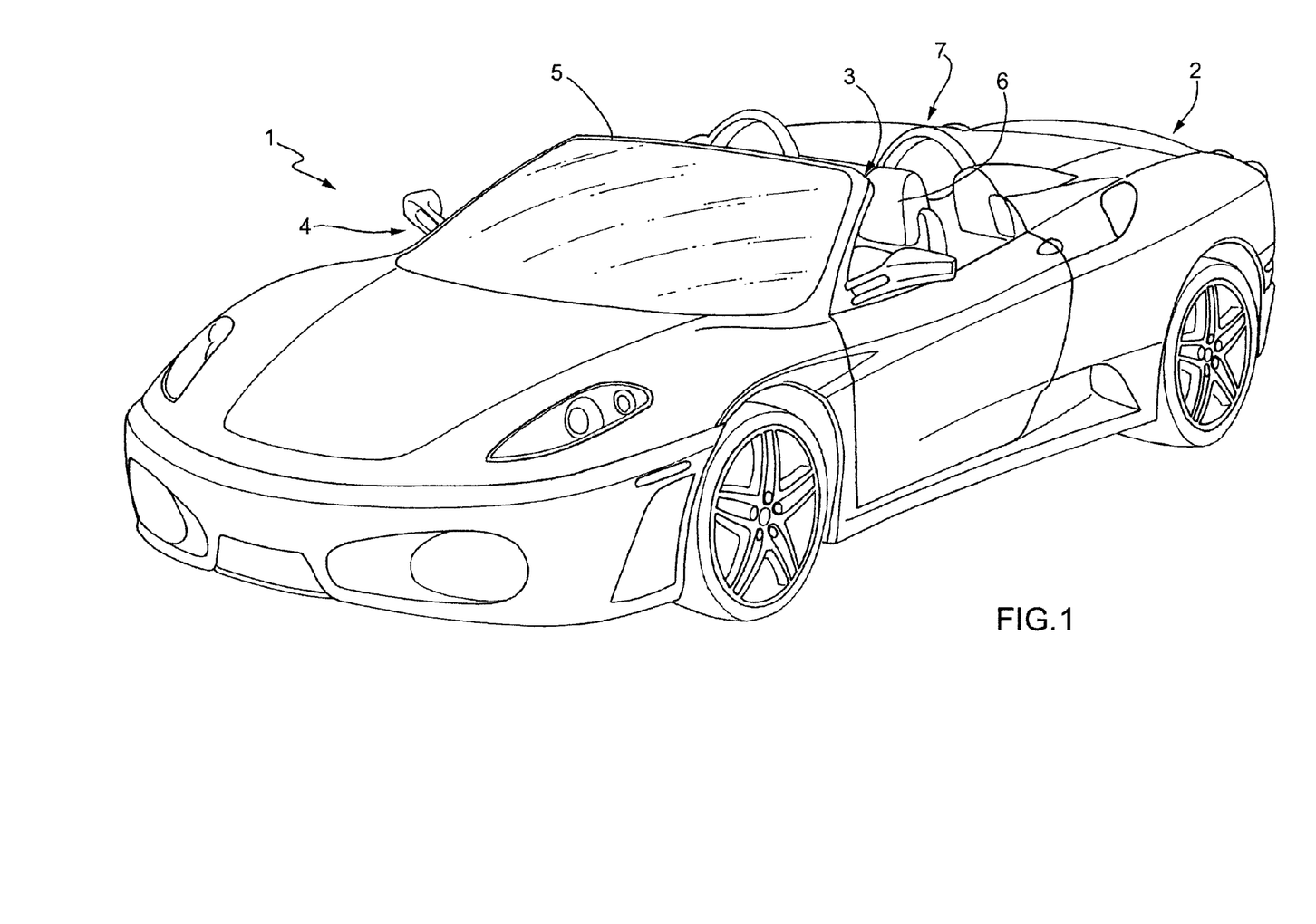
FIG. 1 is a perspective view of a vehicle made in accordance with the present subject matter, in which the convertible roof is not connected to the vehicle.

In FIG. 1, designated as a whole by 1, is a road vehicle comprising a coachwork 2 and an interior compartment 3.

The interior compartment 3 is enclosed internally by the coachwork 2, is completely uncovered, and is delimited or bordered at the front by a windscreen 4 enclosed by a U-shaped frame 5. Housed inside the interior compartment 3 are two seats 6 for accommodating two occupants.

The two seats 6 are protected at the rear by a protection structure 7, better known as "roll-bar structure" 7, which is designed to protect the occupants of the vehicle 1 in the case where the vehicle 1 turns over and must be able to withstand the weight of the vehicle 1 without breaking.

Figure 7:
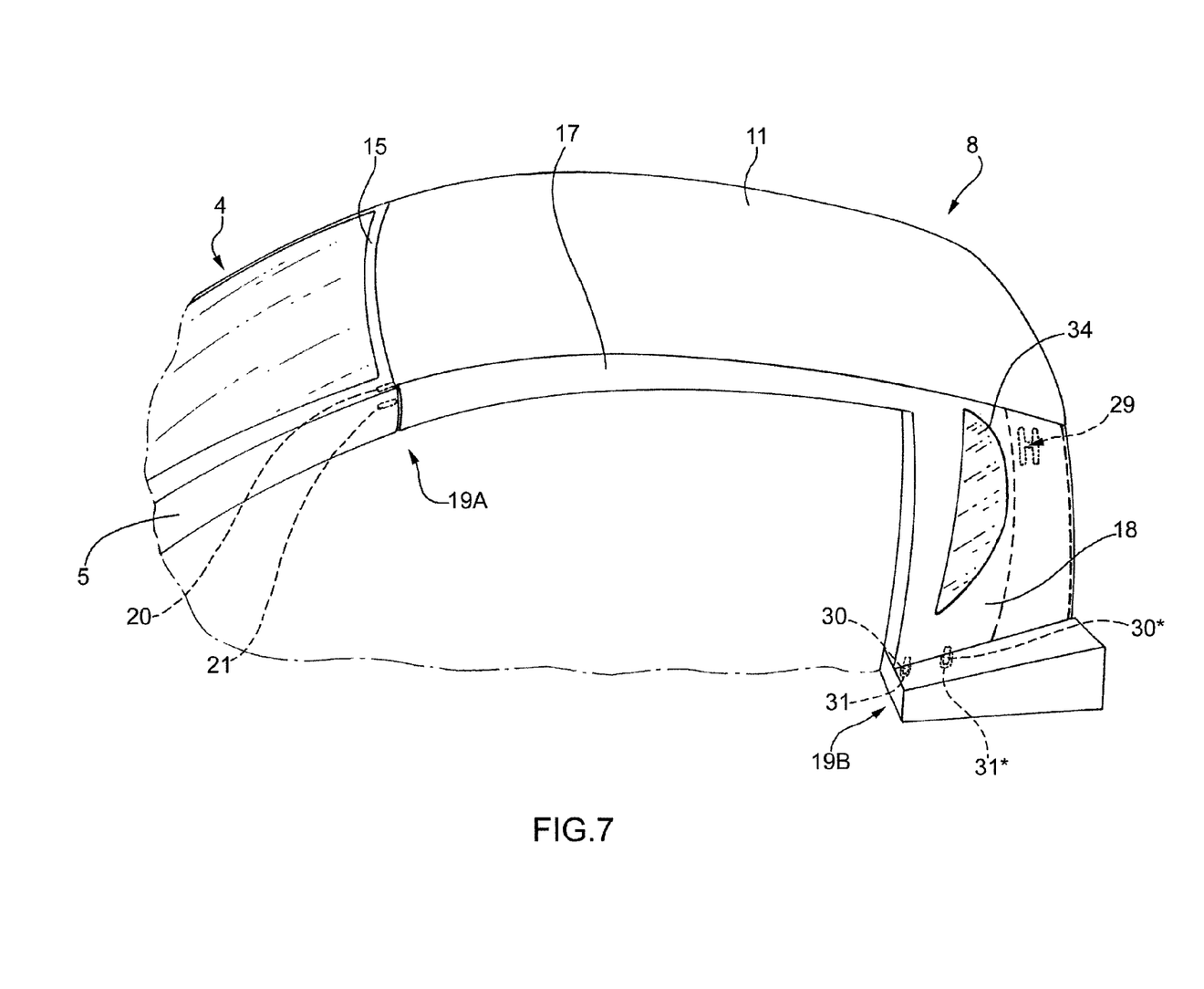
FIG. 7 illustrates a detail of the vehicle of FIG. 1 in which the convertible roof made according to the first embodiment is connected to the vehicle.

The coachwork 2 of the vehicle is pre-arranged for being connected to a convertible roof 8, which is designed to define a position for closing the interior compartment 3 (illustrated in FIG. 7) in which the entire interior compartment 3 is covered by the convertible roof 8 itself.

When the vehicle 1 is travelling with the interior compartment 3 uncovered, the convertible roof 8 is housed in a purposely provided compartment 9. The compartment 9 for housing the convertible roof 8 is made in the coachwork 2, in a central position behind the interior compartment 3 and is closed by a cover, which, in the closing position, sets itself flush with the rest of the coachwork 2. In an alternative embodiment (not illustrated), the function of cover of the compartment 9 is performed directly by the boot lid.

Figure 3:
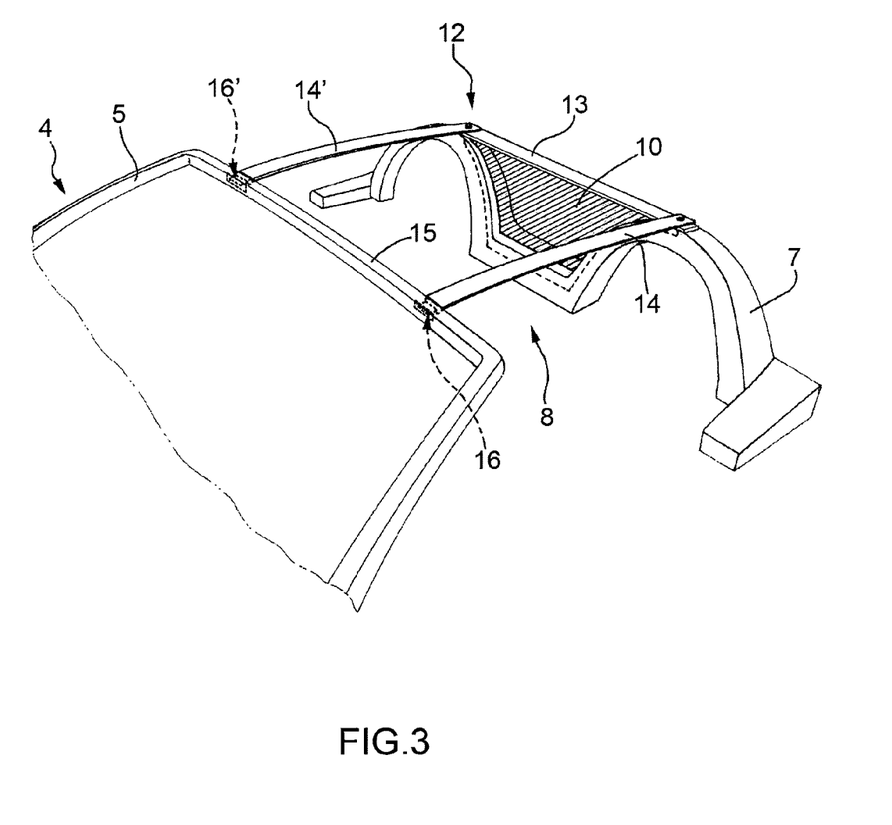
FIG. 3 illustrates a detail of the vehicle of FIG. 1 in a first initial step of the process of connection of a first embodiment of the convertible roof to the body of the vehicle.

According to what is illustrated in FIG. 3, the convertible roof 8 comprises a plane transparent panel 10, which is set substantially vertical (or with appropriate inclination so as not to generate any troublesome reflections on the internal rearview mirror of the vehicle 1) and defines a rear window 10 of the interior compartment 3, made of single-layer or multi-layer glass or else of some other transparent material and preferably supported by a frame.

The convertible roof 8 then comprises a covering cloth 11 and a supporting frame 12, which is designed to support the covering cloth 11 and can be mechanically connected to the coachwork 2. In particular, the supporting frame 12 is designed to provide a connection structure between the two ends of the interior compartment 3, namely, between the roll-bar structure 7 and the frame 5 of the windscreen 4.

Figure 2:
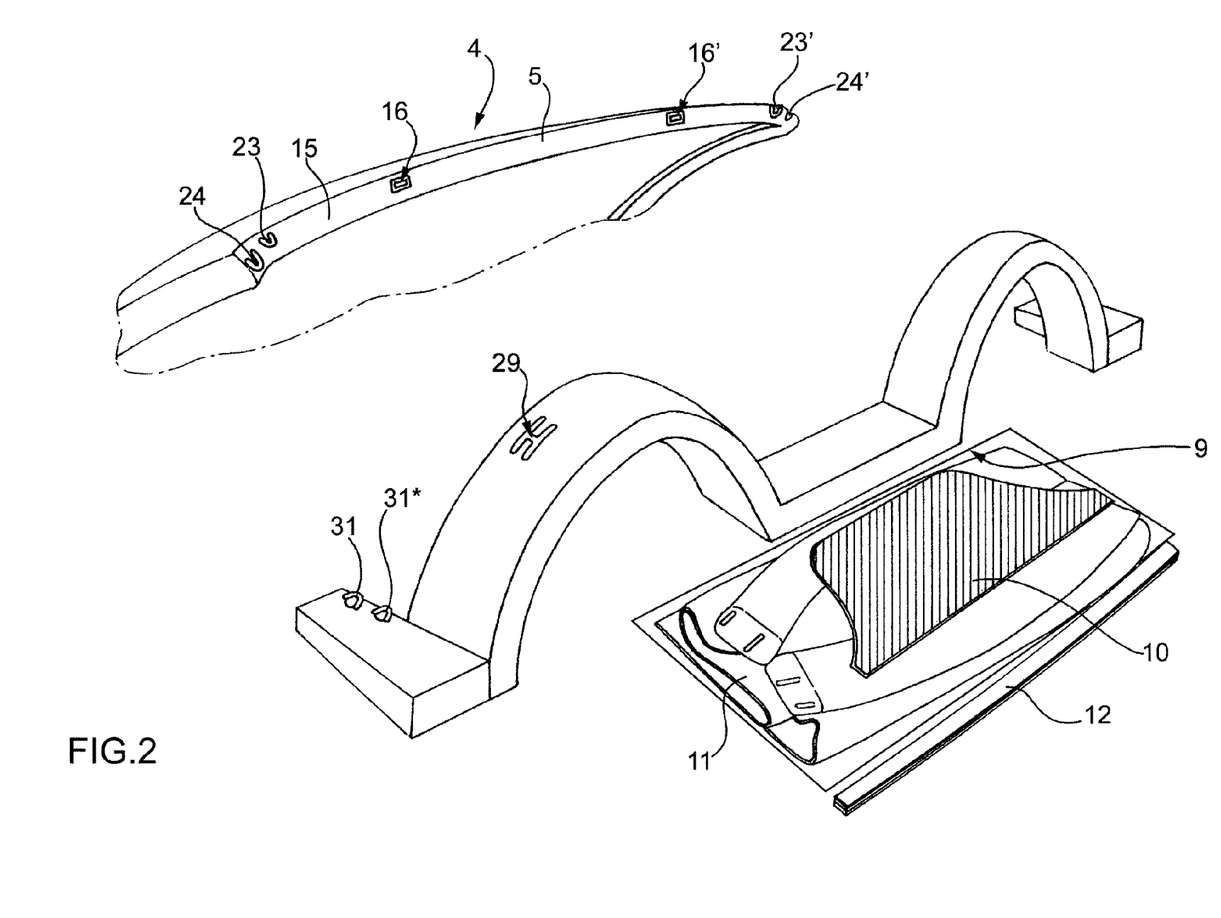
FIG. 2 illustrates a detail of the passenger compartment of the vehicle of FIG. 1, in which the convertible roof is not connected to the vehicle.

According to what is illustrated in FIG. 3, the supporting frame 12 comprises a rear cross member 13, which can be connected to a top edge of the rear window 9, and two arched portions, designated by 14 and 14', which have a relatively small thickness and are hinged to respective ends of the cross member 13 at a rear end thereof. In a position of opening of the supporting frame 12, the two arched portions 14 and 14' are instead set in a direction substantially orthogonal to the cross member 13 and are coupled to the U-shaped frame 5 of the windscreen 4. The top cross member 15 of the frame 5 has in fact two seats 16 and 16' (better illustrated in FIG. 2) made for housing a free front end of a respective arched portion 14, 14', which, in order to engage the seats 16 and 16', undergoes a slight deformation so as to be arched upwards.

The cloth 11 is rolled up inside the compartment 9 in order to reduce the encumbrance as much as possible; after extraction, it is rested on the two arched portions 14 and 14' and unrolled so as to set itself substantially horizontal.

Figure 4:
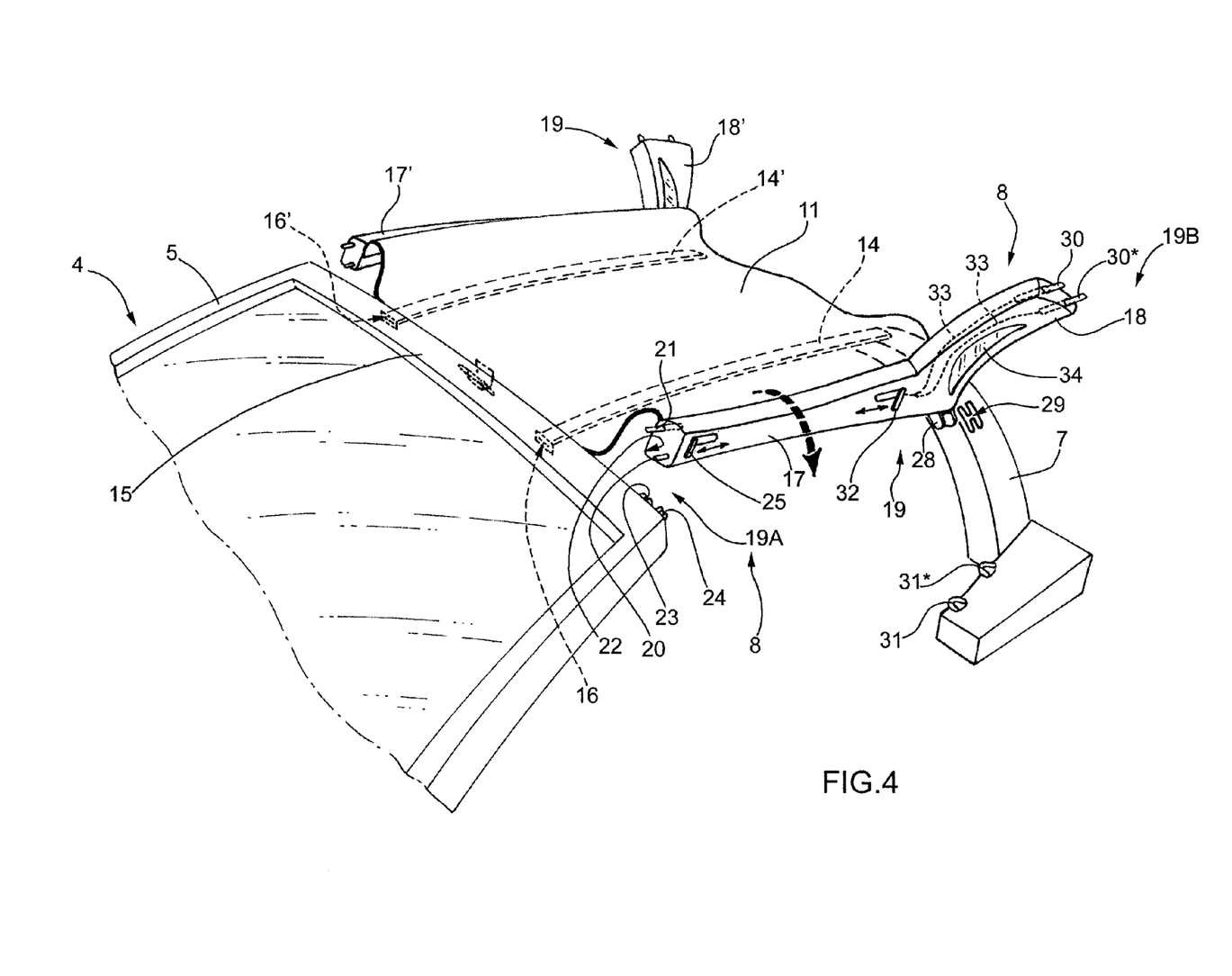
FIG. 4 illustrates a detail of the vehicle of FIG. 1 in a second intermediate step of the process of connection of a first embodiment of the convertible roof to the body of the vehicle.

As is illustrated more clearly in FIG. 4, the covering cloth 11 is substantially horizontal in the position of closing of the interior compartment 3 and has two side beams 17 at respective ends. The two side beams 17 carry connected thereto two side panels 18, at a rear end thereof. The side beams 17, together with the arched portions 14 and 14', concur in defining the profile of the covering cloth 11 in the position of connection with the coachwork 2.

The two side panels 18 have an arched profile and are set perpendicular to the covering cloth 11 itself so as to be substantially vertical in the position for closing the interior compartment 3. Finally, the two side panels 18 are connected to the coachwork 2 at their free ends. The bottom edge of each side beam 17 and the internal edge of a respective side panel 18 concur also in defining the continuous profile of a seat (not illustrated) designed to receive a respective side window (not illustrated) of the vehicle 1 with the interposition of purposely provided weatherproofing (not illustrated).

The vehicle 1 then comprises engagement means 19 for connecting the convertible roof 8 to the coachwork 2 in order to determine the position for closing the interior compartment 3. The engagement means 19 are divided into: front engagement means 19A for front connection of the side beam 17 to the U-shaped frame 5 of the windscreen 4; and rear engagement means 19B for connection of the side member 16 and of the side panel 18 to the rear portion of the coachwork 2 located immediately behind the interior compartment 3.

The front engagement means 19A comprise a pair of pins, designated respectively by and 20 and 21, which project from a front surface 22 of a respective side beam 17 and extend towards the U-shaped frame 5 of the windscreen 4.

The two pins 20 and 21 have respective axes substantially parallel to one another.

Figure 5:
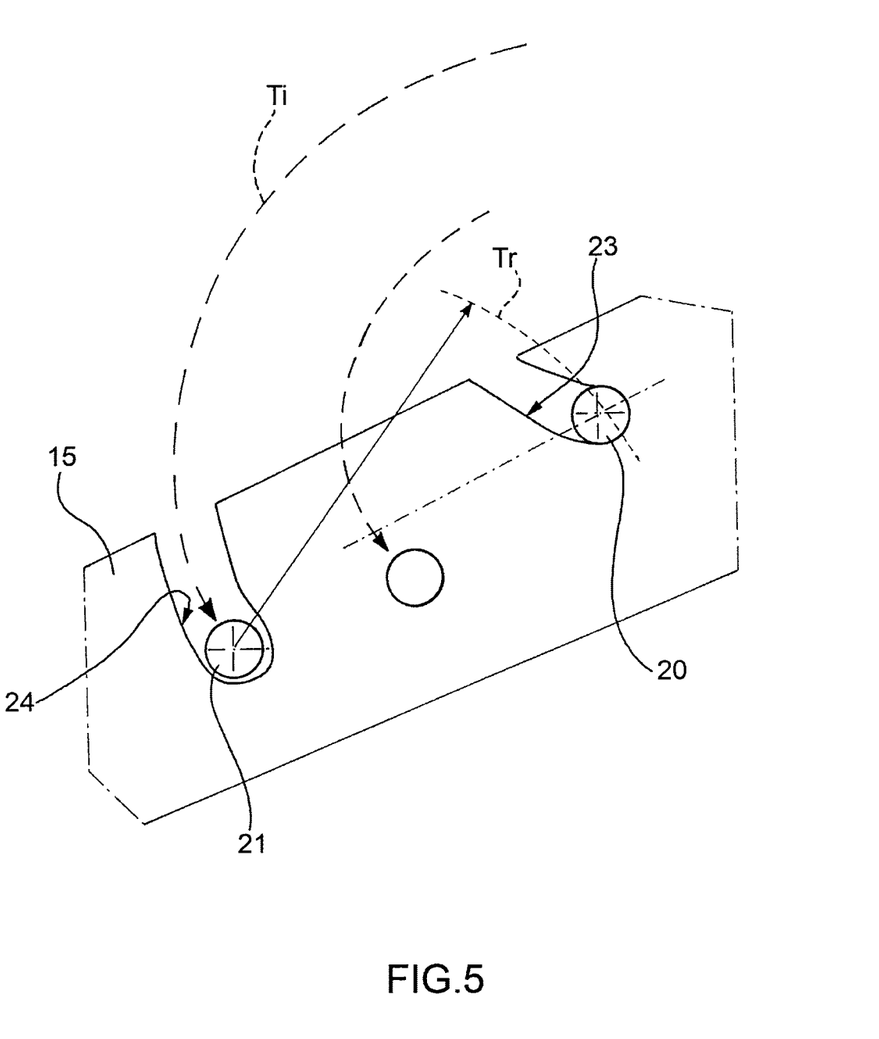
FIG. 5 is a cross-sectional view of a detail of the windscreen of the vehicle of FIG. 1.
Figure 6:
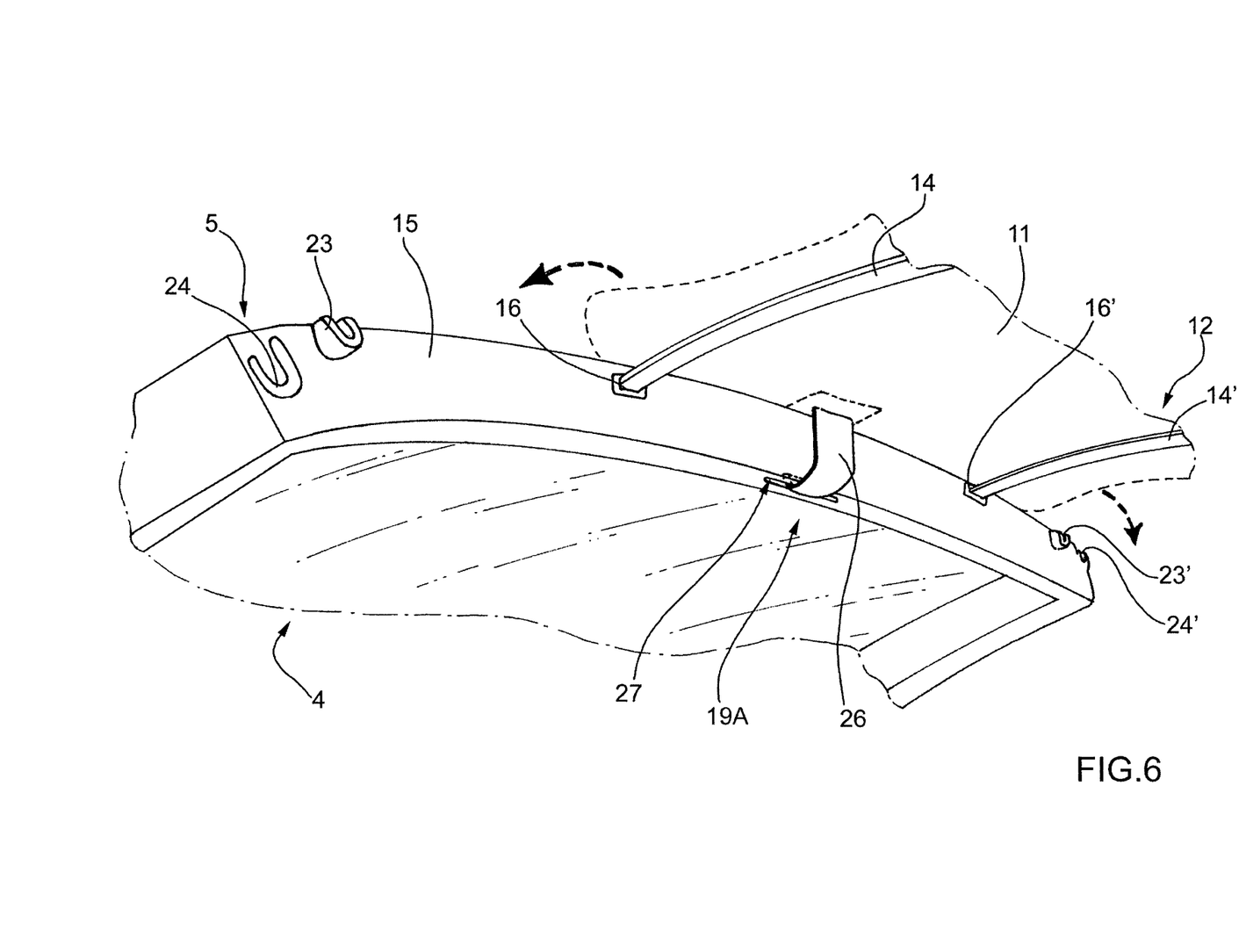
FIG. 6 illustrates a detail of a first embodiment of the convertible roof connected to the body of the vehicle of FIG. 1.

The pin 20 is fixed and set more internally, i.e., towards the center of the covering cloth 11 and towards the other side beam 17'. The pin 20 co-operates with a respective slot 23, made in the top cross member 15 of the U-shaped frame of the windscreen. The slot 23 (better illustrated in FIG. 2) has in cross section a width such as to enable easy insertion of the corresponding fixed pin 20 by the occupant of the vehicle 1. The slot 23 for insertion of the fixed pin 20 has a profile that does not coincide with the ideal path of extraction of the pin itself, designated by Ts in FIG. 5. The profile of the slot 23 has been made in this way to prevent the fixed pivot pin 20 from possibly sliding out of the corresponding slot 23 in an undesirable way.

The pin 21 is set more externally, i.e., towards the outside of the coachwork 2. The pin 21 is mobile along the axis between a retracted position, in which the pin 21 disappears within the side beam 17, and an advanced position of insertion, in which the pin 21 projects from the front surface 22 of the side member towards the U-shaped frame 5 of the front windscreen 4.

The pin 21 co-operates with a respective slot 24, which is also made in the top cross member 15 of the U-shaped frame 5 of the windscreen 4. The slot 24 has in cross section a width such as to enable easy insertion of the corresponding pin 21 by the occupant of the vehicle 1. The slot 24 in which the pin is inserted has a profile that coincides with the ideal path of insertion of the corresponding pin 21, designated by Ti in FIG. 5. In other words, the profile of the slot 24 has been made in this way for facilitating insertion of the pin 21.

Actuation of the mobile pin 21 from the advanced position of insertion to the retracted position and vice versa is controlled by a handle 25, which projects from the side beam 17 downwards within the interior compartment 3.

According to a variant, the two pins 20 and 21 have mushroom-shaped heads so as to compensate for the dimensional tolerances and recover any possible play in the longitudinal direction.

According to a first variant, the mobile pin 21 and the handle are made of a single piece, and a central portion is embedded within the side beam 17.

According to a second variant, the mobile pin 21 and the handle 25 are not made of a single piece, but rather are connected via a flexible cable, which is embedded within the side beam 17.

In use, after the occupant has unrolled the covering cloth 11, the occupant inserts the fixed pin 20 into the respective slot 23. At this point, the side beam 17 performs a rotation about the axis of the fixed pin 20. The mobile pin 21 follows the path Ti of insertion during rotation of the side beam 17. The occupant must act on the actuation handle 25 to bring the mobile pin 21 into the retracted position in such a way that, during insertion, the pin 21 itself does not interfere with the respective slot 24. Once rotation has been completed and the pin 21 is inserted in the slot 24, the occupant can release the actuation handle 25 to enable the mobile pin 21 to set itself in the advanced position.

The front engagement means 19A further comprise a hook 26, which is connected to a front edge of the covering cloth 11. The hook 26 is set approximately in the median point of the covering cloth 11. In this way, when the convertible roof 8 is connected to the coachwork 2 of the vehicle 1, the hook 26 is located between the two arched portions 14 and 14'. The hook 26 is substantially U shaped so as to hook into a groove 27 made in the top cross member 15 of the U-shaped frame 5 of the windscreen 4.

The rear engagement means 19B comprise an appendage 28 that projects from the inner surface of the side panel 18 at a top end thereof and extends towards the inside of the interior compartment 3. The appendage 28 co-operates with a respective seat 29, made in a rear portion of the coachwork 2 and, in particular, on the roll-bar structure 7. According to a variant, the seat 29 is substantially shaped like an H in plan view.

The rear engagement means 19B then comprise a pair of mobile pins, designated respectively by 30 and 30*, which are connected to a bottom surface of a respective side panel 18 and extend downwards, i.e., towards the coachwork 2.

The two mobile pins 30, 30* have respective axes substantially parallel to one another and are set substantially at respective bottom ends of the side panel 18.

Each mobile pin 30, 30* co-operates with a respective slot 31, 31* made in a portion of the coachwork 2 that delimits the interior compartment 3 at the sides. Each slot 31, 31* has a width such as to enable easy insertion of the corresponding pin 30, 30* by the occupant of the vehicle 1.

Each pin 30, 30* is mobile along a respective axis between a retracted position, in which the pin 30, 30* disappears within the side panel 18, and an advanced position of insertion, in which the pin 30, 30* projects from the side panel 18 towards the coachwork 2 from the bottom surface of the side panel 18 itself.

Actuation of the pins 30, 30* from the advanced position of insertion to the retracted position and vice versa is controlled by a handle 32, which is set within the side member and projects partially downwards within the interior compartment 3.

The mobile pins 30, 30* are controlled by the same actuation handle 32 so as to render connection of the covering cloth 11 to the coachwork 2 more convenient. The handle 32 and the mobile pins 30, 30* are not made of a single piece, but rather are connected via respective flexible cables 33, which are embedded partially within the side beam 17 and partially within the side panel 18.

The covering cloth 11 comprises a covering strip, which is applied along the front and rear perimetral edges of the covering cloth 11 (i.e., in a position corresponding to the top cross member 15 of the frame 5 and to the cross member 13 of the supporting frame 12). The strip is applied with interposition of a tensioning wire, which is applied along the front and rear perimetral edges of the covering cloth 11 and is moreover connected to the two side beams 17, 17'.

In use, as described previously, the side beam 17 performs a rotation, describing the path about the axis of the pin 20. Simultaneously with insertion of the pin 20 in the respective slot 23, the occupant engages the appendage 28 in the seat 29. Once this step is completed, the occupant must act on the actuation handle 32 so as to bring the two mobile pins 30, 30* into the retracted position. In this way, during connection of the side panels 18, the mobile pins 30, 30* of each side panel 18 do not interfere with the rest of the coachwork 2. Once rotation about the axis has been completed, and the pins 30, 30* are in the retracted position and each of them faces the respective slot 31, 31*, the occupant can release the actuation handle 32 to enable the mobile pins 30, 30* to set themselves in the advanced position and engage the respective slot 31, 31*.

Rotation of the side beam 17 about the axis of the pin 20 brings about tensioning of the tensioning wire. The covering strip applied along the front and rear perimetral edges of the covering cloth 11 is also tensioned by the action of the wire; in this way, the covering strip adheres perfectly to the top cross member 15 of the frame 5 and to the cross member 13 of the supporting frame 12 so as to close the interior compartment 3 hermetically.

According to a variant, the side panel 18 has a plane transparent insert 34, which is made of single-layer or multi-layer glass or else of some other transparent material. The insert 34 may present shapes other than the crescent shape represented in FIG. 7. The insert 34 guarantees the driver of the vehicle 1 a good lateral visibility and affords a lighter styling of the vehicle 1.

According to a variant (not illustrated), the convertible roof 8 is not provided with the supporting frame 12. A plurality of (preferably three) stiffening cross members are integrated directly in the covering cloth 11. The covering cloth 11 is moreover provided with weatherproofing strips along its own front and rear perimetral edges to prevent any infiltration of water into the interior compartment 3.

FIGS. 8 to 11 illustrate a first improvement, provided according to the teachings of the present subject matter, of the known convertible roof 8 of FIGS. 3 to 7. In FIGS. 8 to 11, corresponding parts of the various embodiments are designated, where possible, by the same reference numbers as the ones used in FIGS. 3 to 7.

The embodiment illustrated in FIGS. 8 to 11 differs from the embodiment illustrated in FIGS. 3 to 7 in that the convertible roof 8' illustrated in FIGS. 8 to 11 comprises a rigid covering cloth 11' and a pair of side beams 17', separated from the rigid covering cloth 11' (only one of which will be described in detail in the ensuing treatment), and in that the convertible roof 8 does not comprise the supporting frame 12.

Figure 8:
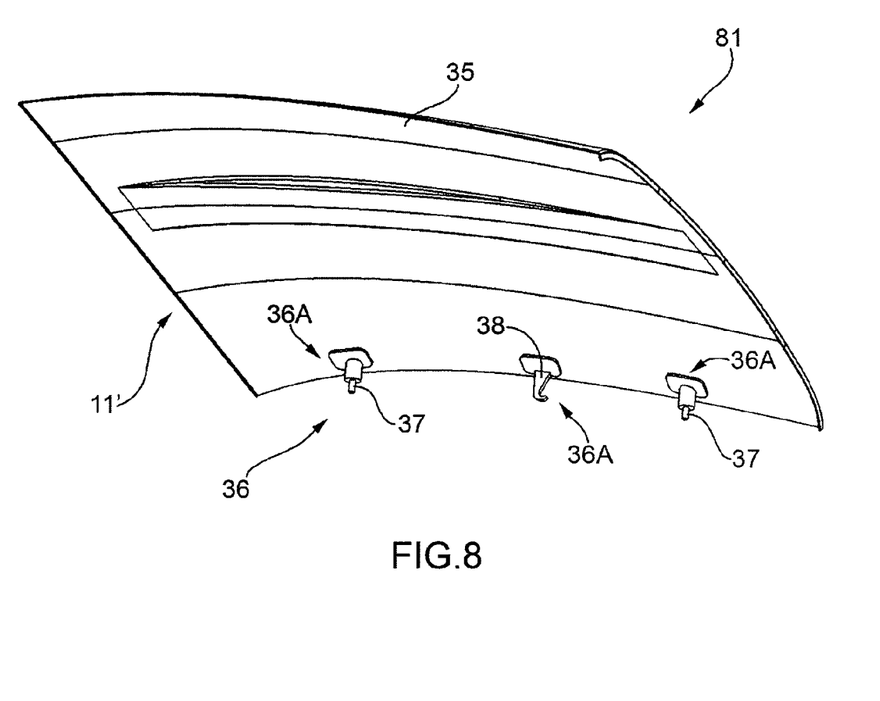
FIG. 8 is a perspective view from beneath of a rigid covering canvas of a second embodiment of the convertible roof.

The rigid covering cloth 11' basically consists of a carbon-fiber panel 35, which, when it is not in use, is set within a compartment (not illustrated) made immediately behind the seats 6 in the interior compartment 3 in order to reduce the encumbrance as much as possible. The panel 35 is set substantially horizontal in the position for closing the interior compartment 3. Since the supporting frame 12 is not envisaged, the rigid covering cloth 11' comprises a pair of weatherproofing strips set at a front perimetral edge and a rear perimetral edge of the panel 35 and such as to be located, in use, respectively between the panel 35 and the rear window 10 and between the panel 35 and the U-shaped frame 5 of the windscreen 4.

Figure 9:
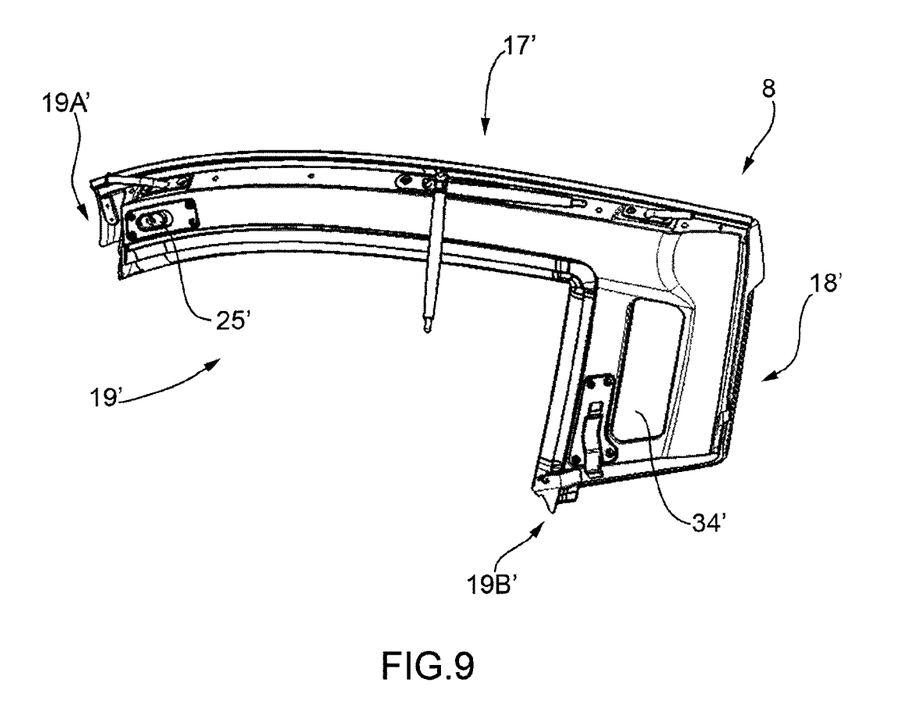
FIG. 9 is a perspective view of a side member of the second embodiment of the convertible roof.
Figure 10:
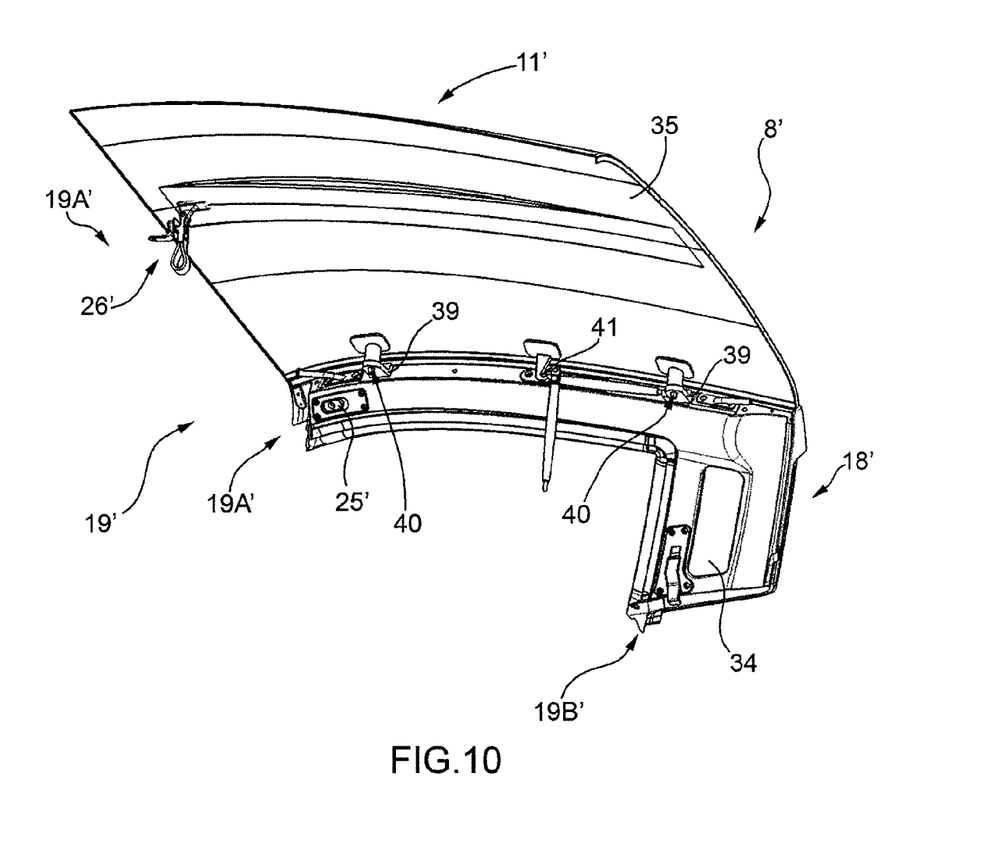
FIGS. 10 and 11 illustrate the second embodiment of the convertible roof.
Figure 11:
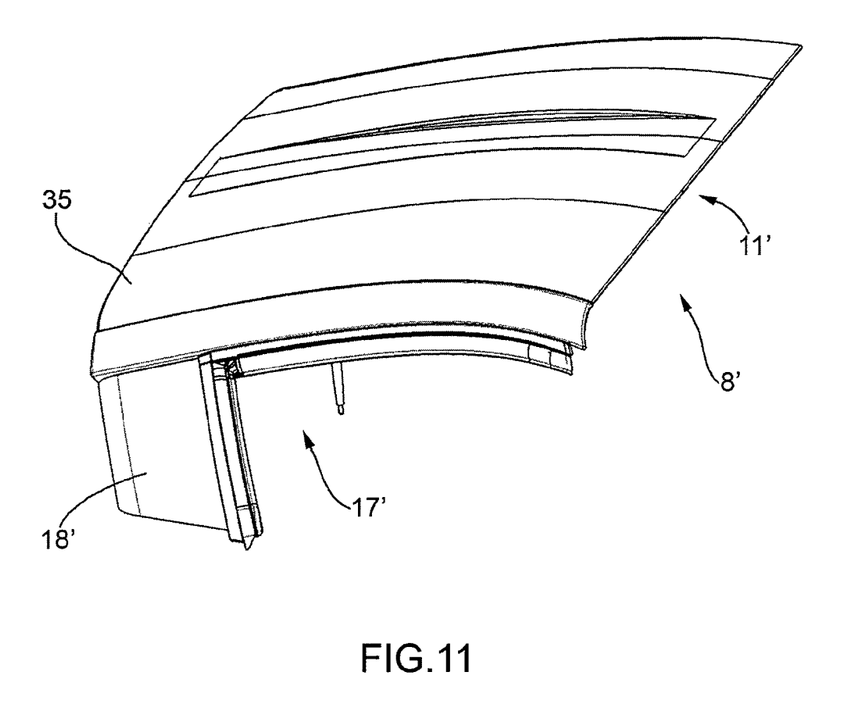

The roof 8' then comprises the two side beams 17' that carry two side panels 18' connected thereto, at a rear end thereof.

The two side panels 18' have an arched profile and are set perpendicular to the rigid covering cloth 11' itself so as to be substantially vertical in the position for closing the interior compartment 3. The bottom edge of each side beam 17' and the internal edge of a respective side panel 18' concur also in defining the continuous profile of a seat (not illustrated) designed to receive a respective side window (not illustrated) of the vehicle 1 with the interposition of purposely provided weatherproofing strips (not illustrated). According to a variant, the side panel 18' has a plane transparent insert 34', which is made of single-layer or multi-layer glass or else of some other transparent material and is designed to guarantee the driver of the vehicle 1 a good lateral visibility and provide a lighter styling of the vehicle 1.

The vehicle 1 then comprises engagement means 19' for connecting the convertible roof 8' to the coachwork 2 in order to determine the position for closing the interior compartment 3. The engagement means 19' are divided into: front engagement means 19A' for front connection of a respective side beam 17' to the U-shaped frame 5 of the windscreen 4; and rear engagement means 19B' for connection of the side beam 17' and of the side panel 18' to the rear portion of the coachwork 2 that is set immediately behind the interior compartment 3.

Actuation of the front engagement means 19A' from an advanced position to a retracted position and vice versa is controlled by a handle 25', which projects from the side beam 17' and extends within the interior compartment 3.

The front engagement means 19A' further comprise a hook 26', which is set in the proximity of a front edge of the rigid covering cloth 11' (i.e., of the carbon-fiber panel 34). The hook 26' is set approximately in the median point of the rigid covering cloth 11'. The hook 26' is designed to couple with a purposely provided groove made in the top cross member 15 of the U-shaped frame 5 of the windscreen 4.

The rear engagement means 19B' then comprise mobile pins connected to a bottom surface of the side panel 18', which extend downwards, i.e., towards the coachwork 2. Actuation of the rear engagement means 19B' from an advanced position to a retracted position and vice versa is controlled by a handle 32'.

The convertible roof 8' then comprises means 36 for connection of the rigid covering cloth 11' to the two side beams 17'. In particular, the rigid covering cloth 11' comprises top connection means 36A, which are connected to a bottom surface of the panel 35, extend towards the inside of the interior compartment 3, and are uniformly distributed throughout the width of the panel 35. In addition, the top connection means 36A are set at side ends of the panel 35, in particular in the proximity of the side perimetral edges for coupling with the side beams 17'. The top connection means 36A comprise two pins 37 of a relatively small length and a hook element 38 set between the two pins 37.

The top connection means 36A co-operate with the bottom connection means 36B of the side beam 17', which are connected to an inner surface of the side beam 17' and extend towards the inside of the interior compartment 3. The bottom connection means 36B comprise two flat elements 39, each of which is provided with a respective through hole 40, and a pin 41 set between the two flat elements 39. In use, the two pins engage a respective through hole 40 made in the flat element 39, and the hook element 38 co-operates with the pin 41 to bring about clamping of the panel 35 on the side beams 17'.

In use, the occupant first engages the front engagement means 19A to the U-shaped frame 5 of the windscreen 4. At this point, the side beam 17' performs a rotation until it enables engagement of the rear engagement means 19B to the portion of the coachwork 2 that delimits the interior compartment 3 at the side and at the rear. Once both of the side beams 17' have been connected to the coachwork 2, the occupant can block the rigid covering cloth 11' on the side beams 17' in such a way as to close the interior compartment 3 completely and hermetically.

According to a further variant (not illustrated), the convertible roof 8" comprises both a soft covering cloth 11*, which connects the two side beams 17", and a rigid covering cloth 11**. According to this variant, assembly of the ensemble constituted by the soft covering cloth 11* and the side beams 17" is performed in a way altogether similar to what has been described in the foregoing treatment. Once the ensemble has been connected to the coachwork 2, the occupant can block the rigid covering cloth 11** on the side beams 17" in such a way as to close the interior compartment 3 completely and hermetically.

The embodiments of the convertible roof 8, 8' so far described present certain advantages in so far as they present a small encumbrance and a styling perfectly compatible with the styling of the vehicle 1. In addition, the convertible roof 8, 8' can be conveniently connected to the coachwork 2 also in the case where the vehicle 1 is occupied by just one person, who will by himself be able to carry out in a short time all the necessary operations in sequence.

What is claimed is:

1. A road vehicle comprising:
    a coachwork;
    an interior compartment enclosed by the coachwork and delimited at a front by a windscreen supported by a U-shaped frame;
    a convertible roof, configured to connect to the coachwork to close the interior compartment at a top and comprising a soft covering cloth, which is substantially horizontal in a position to close the interior compartment and which comprises two side beams at respective side ends, wherein each side beam comprises a rigid side panel, which rises in cantilever fashion from a rear end of the side beam and, in the position for closing the interior compartment, is set substantially vertical and perpendicular to the covering cloth; and
    engagement means comprising front engagement means for connecting the covering cloth to the frame of the windscreen, and rear engagement means for connecting two side panels to a portion of the coachwork that delimits the interior compartment at the rear and at the sides and wherein the front engagement means comprise at least one pin that extends from a respective side beam towards the frame and is configured to engage a respective slot in a top cross member of the frame.

2. The vehicle according to claim 1, wherein the convertible roof comprises a supporting frame, configured to mechanically connect to the coachwork to support the covering cloth.

3. The vehicle according to claim 1, wherein the convertible roof comprises a number of stiffening cross members integrated directly in the soft covering cloth.

4. The vehicle according to claim 1, wherein the front engagement means comprise an internal fixed pin, configured to engage a respective first slot in the top cross member, and a first external mobile pin, which is configured to engage a respective second slot in the top cross member; the first mobile pin configured to be actuated by means of a first actuation member so as to set itself between a retracted position, where the first mobile pin is embedded within the side beam, and an advanced position, in which the first mobile pin extends from a front surface of the respective side beam.

5. The vehicle according to claim 4, wherein the first slot has a profile that does not coincide with an ideal path (Ts) of extraction of the fixed pin to restrict said internal fixed pin from sliding out.

6. The vehicle according to claim 5, wherein, when the internal fixed pin is engaged with the first slot, the side beam is configured to turn about an axis of rotation of the fixed pin; the second slot having a profile that coincides with a path (Ti) of insertion of the first external mobile pin during rotation of the side beam.

7. The vehicle according to claim 1, wherein the front engagement means comprise at least one hook, which is connected to a front edge of the covering cloth to couple with a groove in a top cross member of the U-shaped frame of the windscreen.

8. The vehicle according to claim 4, wherein the rear engagement means comprise at least one second mobile pin, which extends from a respective side panel towards the coachwork and is configured to engage a respective third slot in a portion of the coachwork that delimits the interior compartment at the sides, to define the position for closing the interior compartment itself.

9. The vehicle according to claim 8, wherein the second mobile pin is configured to be actuated by means of a second actuation member to set itself between a retracted position, in which the second mobile pin is embedded within the side panel, and an advanced position, in which the second mobile pin extends from a bottom surface of the respective side panel.

10. The vehicle according to claim 9, wherein the second actuation member and the second mobile pin are connected by means of a flexible connection cable, which is embedded within the side panel.

11. The vehicle according to claim 8, wherein the rear engagement means comprise two second mobile pins, which have axes parallel to one another and extend from a respective side panel towards the coachwork and are configured to engage respective third slots in a portion of the coachwork that delimits the interior compartment at the sides.

12. The vehicle according to claim 8, wherein each side panel is mechanically connected to the covering cloth in such a way that rotation of the side panel about an axis of rotation of the internal fixed pin will determine a tensioning of the covering cloth itself.

13. A road vehicle comprising:
a coachwork;
an interior compartment enclosed by the coachwork and delimited at the front by a windscreen supported by a U-shaped frame;
a convertible roof, configured to connect to the coachwork to close the interior compartment at the top and comprising a soft covering cloth, which is substantially horizontal in a position to close the interior compartment and which comprises two side beams at respective side ends, wherein each side beam comprises a rigid side panel, which rises in cantilever fashion from a rear end of the side beam and, in the position for closing the interior compartment, is set substantially vertical and perpendicular to the covering cloth; and
at least one respective pin extending from each of the two side beams, towards the frame and configured to engage a respective slot in a top cross member of the frame.

14. The vehicle according to claim 13, wherein the pin is an internal fixed pin, configured to engage a respective first slot in the top cross member, and comprising a respective first external mobile pin, which is configured to engage a respective second slot in the top cross member; the first mobile pin configured to be actuated by a first actuation member so as to set itself between a retracted position, where the first mobile pin is embedded within the side beam, and an advanced position, in which the first mobile pin extends from a front surface of the respective side beam.

15. The vehicle according to claim 14, wherein the first slot has a profile that does not coincide with a path (Ts) of extraction of the fixed pin to restrict said internal fixed pin from sliding out.

16. The vehicle according to claim 15, wherein, when the internal fixed pin is engaged with the first slot, the side beam is configured to turn about an axis of rotation of the fixed pin; the second slot having a profile that coincides with a path (Ti) of insertion of the first external mobile pin during rotation of the side beam.

17. A road vehicle comprising:
a coachwork;
an interior compartment enclosed by the coachwork and delimited at a front by a windscreen supported by a U-shaped frame;
a convertible roof, configured to connect to the coachwork to close the interior compartment at a top and comprising a soft covering cloth, which is substantially horizontal in a position to close the interior compartment and which comprises two side beams at respective side ends, wherein each side beam comprises a rigid side panel, which rises in cantilever fashion from a rear end of the side beam and, in the position for closing the interior compartment, is set substantially vertical and perpendicular to the covering cloth; and
engagement means comprising front engagement means for connecting the covering cloth to the frame of the windscreen, and rear engagement means for connecting the two side panels to a portion of the coachwork that delimits the interior compartment at the rear and at the sides and wherein the rear engagement means comprise at least one appendage, which extends from a respective side panel at a top end thereof and is configured to engage a respective seat in a portion of the coachwork set immediately behind the interior compartment to define the position for closing the interior compartment.

18. A road vehicle comprising:
a coachwork;
an interior compartment enclosed by the coachwork and delimited at a front by a windscreen supported by a U-shaped frame;
a convertible roof, configured to connect to the coachwork to close the interior compartment at a top and comprising a soft covering cloth, which is substantially horizontal in a position to close the interior compartment and which comprises two side beams at respective side ends, wherein each side beam comprises a rigid side panel, which rises in cantilever fashion from a rear end of the side beam and, in the position for closing the interior compartment, is set substantially vertical and perpendicular to the covering cloth, wherein the side panel comprises a plane transparent insert, which is made of single-layer or multi-layer glass or else of some other transparent material to improve lateral visibility of the vehicle; and
engagement means for connecting the covering cloth to the frame of the windscreen and for connecting the two side panels to a portion of the coachwork that delimits the interior compartment at the rear and at the sides.

19. A road vehicle comprising:

a coachwork;

an interior compartment enclosed by the coachwork and delimited at a front by a windscreen supported by a U-shaped frame;

a convertible roof, configured to connect to the coachwork to close the interior compartment at a top and comprising a covering cloth, which is substantially horizontal in a position to close the interior compartment and which comprises two side beams at respective side ends, wherein each side beam comprises a rigid side panel, which rises in cantilever fashion from a rear end of the side beam and, in the position for closing the interior compartment, is set substantially vertical and perpendicular to the covering cloth; and engagement means comprising front engagement means for connecting the covering cloth to the frame of the windscreen, and rear engagement means for connecting two side panels to a portion of the coachwork that delimits the interior compartment at the rear and at the sides and wherein the front engagement means comprise at least one pin that extends from a respective side beam towards the frame and is configured to engage a respective slot in a top cross member of the frame.

20. The road vehicle of claim 19, wherein the covering cloth is a rigid covering cloth, which is configured to be set in a substantially horizontal position in the position for closing the interior compartment and that comprises a panel; and connection means for connecting the rigid covering cloth to the frame of the windscreen at its own front perimetral edge and to the two side beams at its own side perimetral edges once each side beam has been connected to the frame of the windscreen and to the portion of the coachwork that delimits the interior compartment at the rear and at the sides.

21. The vehicle according to claim 20, wherein the panel is made of carbon fiber.

22. The vehicle according to claim 20 and comprising a soft covering cloth, configured to connect to the two side beams and to set itself, in the position for closing the interior compartment, in a substantially horizontal position and underneath the rigid covering cloth.

23. The vehicle according to claim 20, wherein the connection means comprise top connection means, which are connected to a bottom surface of the panel, extend towards the inside of the interior compartment and co-operate, in a position for closing the interior compartment, with a bottom connection means that are connected to each side beam and extend towards the inside of the interior compartment.

* * * * *